US010518786B2

(12) United States Patent
Parat et al.

(10) Patent No.: US 10,518,786 B2
(45) Date of Patent: Dec. 31, 2019

(54) SYSTEMS AND METHODS FOR PROVIDING AN OPERATION DATA INTERFACE FOR AUTONOMOUS OPERATION OF A VEHICLE

(71) Applicant: GM GLOBAL TECHNOLOGY OPERATIONS LLC, Detroit, MI (US)

(72) Inventors: Shreyas G. Parat, Royal Oak, MI (US); Paul E. Krajewski, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 148 days.

(21) Appl. No.: 15/902,700

(22) Filed: Feb. 22, 2018

(65) Prior Publication Data

US 2019/0256105 A1  Aug. 22, 2019

(51) Int. Cl.
*B60W 50/08* (2012.01)
*G05D 1/00* (2006.01)
*B60W 30/16* (2012.01)
*B60R 1/00* (2006.01)
(Continued)

(52) U.S. Cl.
CPC .......... *B60W 50/085* (2013.01); *B60R 1/00* (2013.01); *B60W 30/16* (2013.01); *B60W 30/181* (2013.01); *G05D 1/0038* (2013.01); *G05D 1/0088* (2013.01); *G06K 9/00791* (2013.01); *B60R 2300/80* (2013.01); *B60W 2750/30* (2013.01)

(58) Field of Classification Search
CPC .. B60W 50/085; B60W 30/181; B60W 30/16; B60W 2750/30; G06K 9/00791; B60R 1/00; B60R 2300/80; G05D 1/0038; G05D 1/0088
See application file for complete search history.

(56) References Cited

U.S. PATENT DOCUMENTS

2007/0005218 A1* 1/2007 Ueyama ............... B60W 30/16
701/96
2014/0362290 A1* 12/2014 Bridges ............ H04N 21/47205
348/484
(Continued)

OTHER PUBLICATIONS

Author: Bengt Halvorson, Title Does the 2010 Lexus LS 600h Park Itself as Well as a Ford?, Nov. 30, 2009 (Year: 2009).*

*Primary Examiner* — Navid Ziaeianmehdizadeh
*Assistant Examiner* — Akram A Manshalin
(74) *Attorney, Agent, or Firm* — Lorenz & Kopf, LLP

(57) ABSTRACT

A method for providing operation data onboard a first vehicle with autonomous capabilities. The method presents an image of an exterior view from the first vehicle with autonomous capabilities, by a user interface touchscreen communicatively coupled to a processor and system memory element; receives user input data to manipulate the image, via the user interface touchscreen; adjusts the image, by the processor, based on the user input data; modifies an operation parameter of the first vehicle with autonomous capabilities, by the processor, based on the user input data, to generate a modified operation parameter, wherein the operation parameter comprises at least one of a following distance, a stopping distance, or a turning speed; and transmits the modified operation parameter, via a communication device communicatively coupled to the processor.

18 Claims, 10 Drawing Sheets

(51) Int. Cl.
*G06K 9/00* (2006.01)
*B60W 30/18* (2012.01)

(56) References Cited

U.S. PATENT DOCUMENTS

| | | | |
|---|---|---|---|
| 2015/0151756 A1* | 6/2015 | Han | B60W 30/146 |
| | | | 701/93 |
| 2016/0159463 A1* | 6/2016 | Wang | G05D 1/0016 |
| | | | 701/2 |
| 2018/0148053 A1* | 5/2018 | Lee | G05D 1/0251 |
| 2019/0025858 A1* | 1/2019 | Bar-Nahum | G08G 5/0078 |
| 2019/0202467 A1* | 7/2019 | Sun | B60W 50/082 |
| 2019/0253611 A1* | 8/2019 | Wang | G06F 3/04842 |

* cited by examiner

SYSTEMS AND METHODS FOR PROVIDING AN OPERATION DATA INTERFACE FOR AUTONOMOUS OPERATION OF A VEHICLE

TECHNICAL FIELD

Embodiments of the subject matter described herein relate generally to providing an interface for user interaction with systems onboard a vehicle with autonomous capabilities. More particularly, embodiments of the subject matter relate to providing a touchscreen interface for user manipulation of an image to manipulate operation of a vehicle with autonomous capabilities.

BACKGROUND

A user of a car with autonomous capabilities may wish to have control over how the car drives. Typically, the user wants to feel comfortable and at ease in their vehicle during autonomous operation, and would like the ability to modulate the various autonomous vehicle operations. Typical user modulation systems for autonomous vehicles (and vehicles with more limited autonomous capabilities) include numeric or step-wise scales, wherein one end of the scale indicates a level of aggressive driving and the other end of the scale indicates a level of mild, non-aggressive driving. However, numeric scales include uncertainty for individual drivers, as the two extremes are not customized to each user.

Accordingly, it is desirable to provide additional operational data onboard a vehicle with autonomous capabilities. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for providing operation data onboard a first vehicle with autonomous capabilities. The method presents an image of an exterior view from the first vehicle with autonomous capabilities, by a user interface touchscreen communicatively coupled to a processor and system memory element; receives user input data to manipulate the image, via the user interface touchscreen; adjusts the image, by the processor, based on the user input data; modifies an operation parameter of the first vehicle with autonomous capabilities, by the processor, based on the user input data, to generate a modified operation parameter, wherein the operation parameter comprises at least one of a following distance, a stopping distance, or a turning speed; and transmits the modified operation parameter, via a communication device communicatively coupled to the processor.

Some embodiments of the present disclosure provide a system for providing operation data onboard a first vehicle with autonomous capabilities. The system includes: a system memory element; a user interface touchscreen, configured to receive user input data via user contact with the user interface touchscreen; a communication device configured to transmit data to an autonomous driving system onboard the first vehicle with autonomous capabilities; and at least one processor communicatively coupled to the system memory element, the user interface touchscreen, and the communication device, the at least one processor configured to: present an image of an exterior view from the first vehicle with autonomous capabilities, via the user interface touchscreen; receive the user input data to manipulate the image, via the user interface touchscreen; adjust the image, based on the user input data; modify an operation parameter of the first vehicle with autonomous capabilities to generate a modified operation parameter, based on the user input data, wherein the operation parameter comprises at least one of a following distance, a stopping distance, or a turning speed; and transmit the modified operation parameter, via the communication device.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
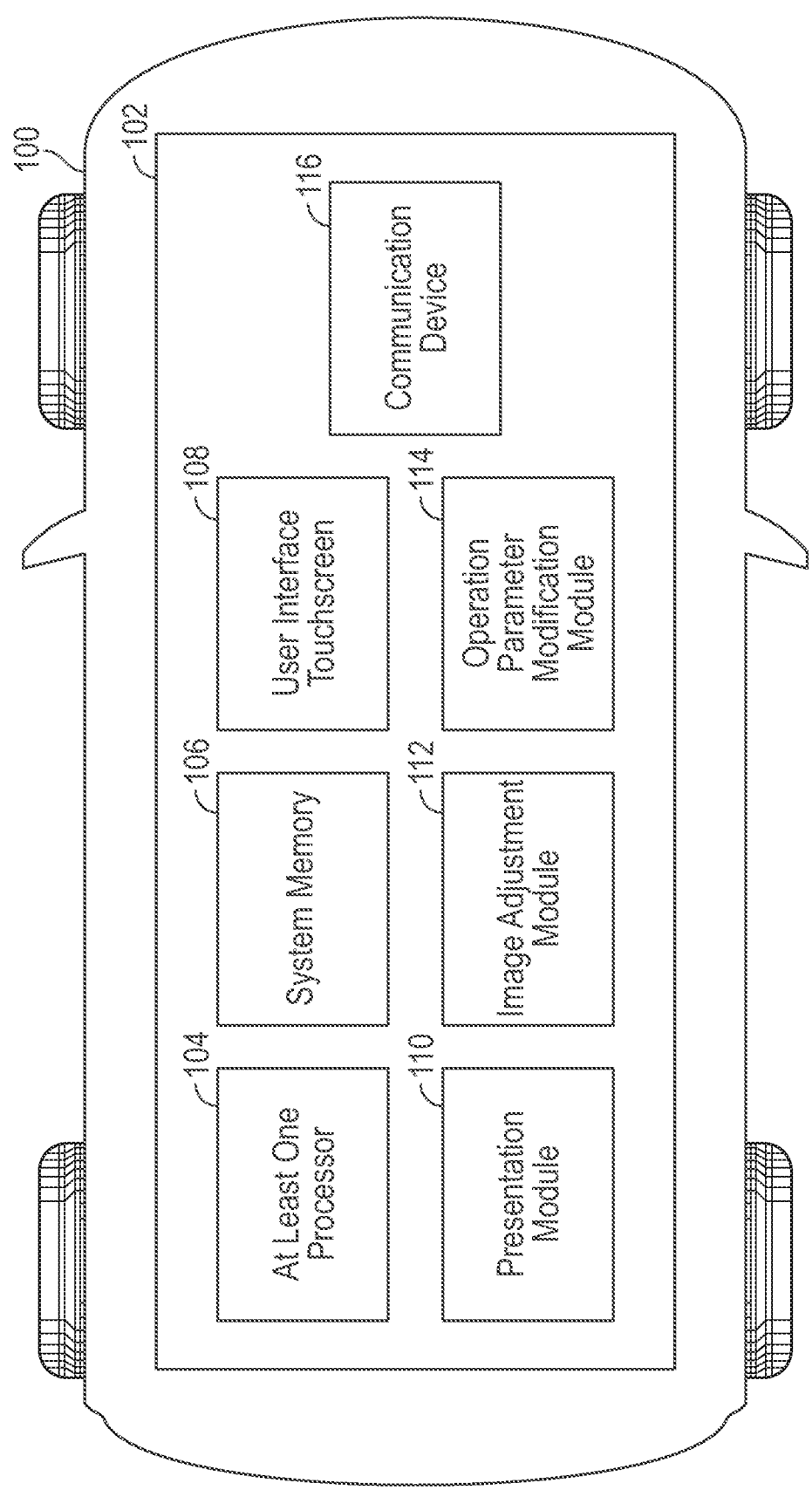
FIG. 1 is a functional block diagram of a user interaction system for a first vehicle with autonomous capabilities, in accordance with the disclosed embodiments.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to systems and methods for providing an interface for user interaction with a first vehicle with autonomous capabilities and functionality of the first vehicle with autonomous capabilities. More specifically, the subject matter relates to providing an image-based, touchscreen interface, wherein a user may interact with the image via the touchscreen to change or alter operation parameters of the first vehicle with autonomous capabilities.

Certain terminologies are used with regard to the various embodiments of the present disclosure. A vehicle with autonomous capabilities is any vehicle that performs one or more functions autonomously, or in other words, performs driving functions without user interaction. Driving functions may include any tasks required for a first vehicle with autonomous capabilities to drive from a first point to a second point. A vehicle with autonomous capabilities may be implemented using any vehicle (i) for which a driver is disengaged from physically operating the vehicle by having his or her hands off the steering wheel and foot off the pedals at the same time (i.e., semi-autonomous capabilities, due to the presence of a steering wheel), or (ii) which is designed to perform all safety-critical driving functions and monitor roadway conditions for an entire trip (i.e., full autonomous capabilities).

Operation parameters of a first vehicle with autonomous capabilities are used by the first vehicle with autonomous capabilities to perform driving functions without user interaction. Examples of operation parameters may include, without limitation, preconfigured values for a following distance, a stopping distance, and a turning speed. A following distance is a measurable interval of space maintained between the vehicle with autonomous capabilities and a second vehicle that is driving in front of the vehicle with autonomous capabilities. A stopping distance is a distance travelled between a time value at which the vehicle with autonomous capabilities activates stopping functionality (e.g., activates an onboard braking system), and a second time value at which the vehicle with autonomous capabilities comes to a complete stop. A turning speed is the vehicular speed during a redirection of the vehicle with autonomous capabilities, wherein the redirection includes changing a current traveling direction of the vehicle toward a new traveling direction that is different from the current traveling direction. Vehicular speed is a rate at which the vehicle with autonomous capabilities travels a given distance, and is usually provided using a ratio of distance per time value. Contemplated herein are systems and methods for changing such operation parameters upon receiving a user input request to increase or decrease the preconfigured values for each of the operation parameters.

Referring now to the drawings, FIG. 1 is a functional block diagram of a first vehicle with autonomous capabilities 100 that includes a user interaction system 102, in accordance with the disclosed embodiments. The first vehicle with autonomous capabilities 100 may be any one of a number of different types of types of automobiles (sedans, wagons, trucks, motorcycles, sport-utility vehicles, vans, etc.), aviation vehicles (such as airplanes, helicopters, etc.), watercraft (boats, ships, jet skis, etc.), trains, all-terrain vehicles (snowmobiles, four-wheelers, etc.), military vehicles (Humvees, tanks, trucks, etc.), rescue vehicles (fire engines, ladder trucks, police cars, emergency medical services trucks and ambulances, etc.), spacecraft, hovercraft, and the like.

The user interaction system 102 may be implemented using any vehicle onboard computer system that generally includes, without limitation: at least one processor 104; some form of system memory 106; a user interface touchscreen 108; a presentation module 110; an image adjustment module 112; an operation parameter modification module 114; and a communication device 116. These elements and features of the user interaction system 102 may be operatively associated with one another, coupled to one another, or otherwise configured to cooperate with one another as needed to support the desired functionality—in particular, providing an interface for user interaction with the autonomous operations of the first vehicle with autonomous capabilities 100, as described herein. For ease of illustration and clarity, the various physical, electrical, and logical couplings and interconnections for these elements and features are not depicted in FIG. 1. Moreover, it should be appreciated that embodiments of the user interaction system 102 will include other elements, modules, and features that cooperate to support the desired functionality. For simplicity, FIG. 1 only depicts certain elements that relate to the techniques described in more detail below.

The at least one processor 104 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 104 may be realized as one or more microprocessors, controllers, microcontrollers, or state machines. Moreover, the at least one processor 104 may be implemented as a combination of computing devices, e.g., a combination of digital signal processors and microprocessors, a plurality of microprocessors, one or more microprocessors in conjunction with a digital signal processor core, or any other such configuration.

The at least one processor 104 is communicatively coupled to the system memory 106. The system memory 106 is configured to store any obtained or generated data associated with autonomous operation of the first vehicle with autonomous capabilities 100, and graphical elements associated with the user interaction system 102. The system memory 106 may be realized using any number of devices, components, or modules, as appropriate to the embodiment. Moreover, the user interaction system 102 could include system memory 106 integrated therein and/or a system memory 106 operatively coupled thereto, as appropriate to the particular embodiment. In practice, the system memory 106 could be realized as RAM memory, flash memory, EPROM memory, EEPROM memory, registers, a hard disk, a removable disk, or any other form of storage medium known in the art. In certain embodiments, the system memory 106 includes a hard disk, which may also be used to support functions of the user interaction system 102. The system memory 106 can be coupled to the at least one processor 104 such that the at least one processor 104 can read information from, and write information to, the system memory 106. In the alternative, the system memory 106 may be integral to the at least one processor 104. As an example, the at least one processor 104 and the system memory 106 may reside in a suitably designed application-specific integrated circuit (ASIC).

The user interface touchscreen 108 may include or cooperate with various features to allow a user to interact with the first vehicle with autonomous capabilities 100. Accordingly, the user interface touchscreen 108 may be used as a stand-alone user interface, or the user interface touchscreen 108 may operate cooperatively with various human-to-machine interfaces, e.g., a keypad, keys, a keyboard, buttons, switches, knobs, a touchpad, a joystick, a pointing device, a virtual writing tablet, a touch screen, a microphone, or any device, component, or function that enables the user to select options, input information, or otherwise control the operation of the first vehicle with autonomous capabilities 100. For example, the user interface touchscreen 108 could be manipulated by an operator to provide user input adjustments to the functionality of the first vehicle with autonomous capabilities 100, as described herein.

Generally, the user interface touchscreen 108 includes or cooperates with various features to allow a user to interact with the first vehicle with autonomous capabilities 100 via graphical elements rendered on a display element. Accordingly, the user interface touchscreen 108 may initiate the creation, maintenance, and presentation of a graphical user interface (GUI). The user interface touchscreen 108 implements touch-sensitive technology for purposes of interacting with the GUI. Thus, a user can manipulate the GUI by moving a cursor symbol rendered on the user interface touchscreen 108, or by physically interacting with the user interface touchscreen 108 itself for recognition and interpretation.

The presentation module 110 is configured to present an image that includes an exterior view from the vehicle, via the user interface touchscreen 108. In some embodiments, the presentation module 110 presents a static image (i.e., a still-frame image). In other embodiments, the presentation module 110 presents a series of images in the form of a video presentation. The presentation module 110 is configured to present the image via the user interface touchscreen 108. The presented image is an exterior view from the first vehicle with autonomous capabilities 100, wherein the exterior view may include anything located outside the vehicle (e.g., the road, street signs, traffic lights, oncoming traffic, passing traffic, buildings, obstacles, or the like). The presented image may be manipulated by a user, via the user interface touchscreen 108.

The image adjustment module 112 is configured to change, alter, or otherwise adjust the presented image of the exterior view, based on user input received via the user interface touchscreen 108. Generally, the image is manipulated by a user during operation of the first vehicle with autonomous capabilities 100, such that the user may change operating parameters of the first vehicle with autonomous capabilities 100. When the presentation module 110 presents a static image, the user may manipulate the static image, via the user interface touchscreen 108, to zoom in or zoom out. Zooming in decreases a depicted distance between the first vehicle with autonomous capabilities 100 and objects or vehicles depicted in the image, and zooming out increases a depicted distance between the first vehicle with autonomous capabilities 100 and objects or vehicles depicted in the image. By increasing or decreasing the depicted distance, the user can increase or decrease a preconfigured value for a following distance or a stopping distance for the first vehicle with autonomous capabilities 100.

When the presentation module 110 presents a video (e.g., a series of images or "frames" presented in sequence), via the user interface touchscreen 108, the user may manipulate the video by stopping playback of the video. Playback of the video presents a simulated driving scene, (i.e., an exterior view from the outside of the first vehicle with autonomous capabilities 100 during driving motion). A user may stop or pause playback of the video such that a static image or still-frame image is presented via the user interface touchscreen 108. Based on the timing of the user input selection to stop or pause the video, the stopped-video, still-frame image presented depicts objects and vehicles at a particular distance from the first vehicle with autonomous capabilities 100. The user selects the point in the video at which to stop the video such that the depicted distance may be used. Thus, the user selects the distance from the first vehicle with autonomous capabilities 100 to external objects or vehicles depicted in the image by interacting with the video and adjusting the image by stopping the video.

Alterations or changes to the presented image may include, without limitation: (i) making contact with the user interface touchscreen 108 using a "pinching-in" motion to zoom out on the image; (ii) making contact with the user interface touchscreen 108 using a "pinching-out" motion to zoom in on the image; and (iii) stopping a video presentation during playback. Changing the image using any of the methods described herein results in a presented still-frame image that has been calibrated for distance analysis using a plurality of data points.

The operation parameter modification module 114 is configured to modify operating parameters of the first vehicle with autonomous capabilities 100 using user input data indicated by user interactions with the image presented by the user interface touchscreen 108. Specifically, the operation parameter modification module 114 adjusts operation of the first vehicle with autonomous capabilities 100 by: (i) identifying user manipulations (i.e., changes or alterations) to the presented image, (ii) determining changes to operation parameters of the first vehicle with autonomous capabilities 100 that correspond to the identified user manipulations, and (iii) transmitting (via the communication device 116) the determined changes to the operation parameters associated with first vehicle with autonomous capabilities 100 operations.

In practice, the presentation module 110, the image adjustment module 112, and/or the operation parameter modification module 114 may be implemented with (or cooperate with) the at least one processor 104 to perform at least some of the functions and operations described in more detail herein. In this regard, the presentation module 110, the image adjustment module 112, and/or the operation parameter modification module 114 may be realized as suitably written processing logic, application program code, or the like.

The communication device 116 is configured to communicate data between user interaction system 102 and autonomous vehicle systems that perform autonomous vehicle functionality for the first vehicle with autonomous capabilities 100. More specifically, among other data communication tasks (e.g., transmitting data, receiving data), the communication device 116 transmits data for use by systems of the first vehicle with autonomous capabilities 100 to perform autonomous vehicle functionality (e.g., operating the first vehicle with autonomous capabilities 100 according to operational parameters associated with autonomous operation of a vehicle, such as a following distance, a stopping distance, a turning speed, or the like). The communication device 116 may transmit and receive communications over a wireless local area network (WLAN), the Internet, a satellite uplink/downlink, a cellular network, a broadband network, a wide area network, or the like. As described in more detail below, data received by the communication device 116 may include, without limitation: image data (e.g., still-image data, video presentation data), operation parameter data for the first vehicle with autonomous capabilities 100, and other data compatible with the user interaction system 102. Data provided by the communication device 116 includes, without limitation, changes or alterations to operational parameters of the first vehicle with autonomous capabilities 100 (e.g., configured following distances, stopping distances, and turning speeds), and the like.

Figure 2:
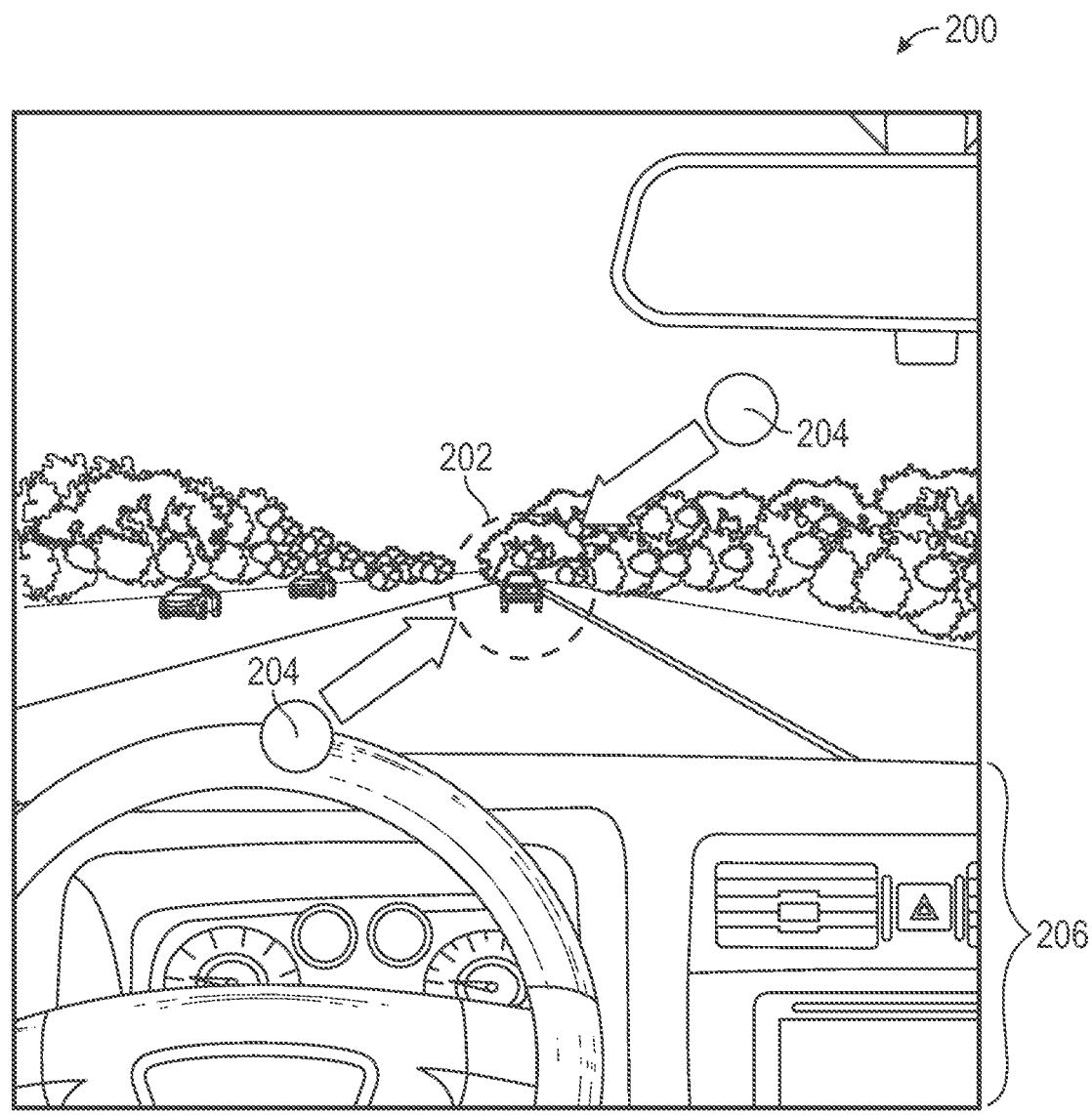
FIG. 2 is a diagram of a user interface touchscreen, in accordance with the disclosed embodiments.
Figure 3:
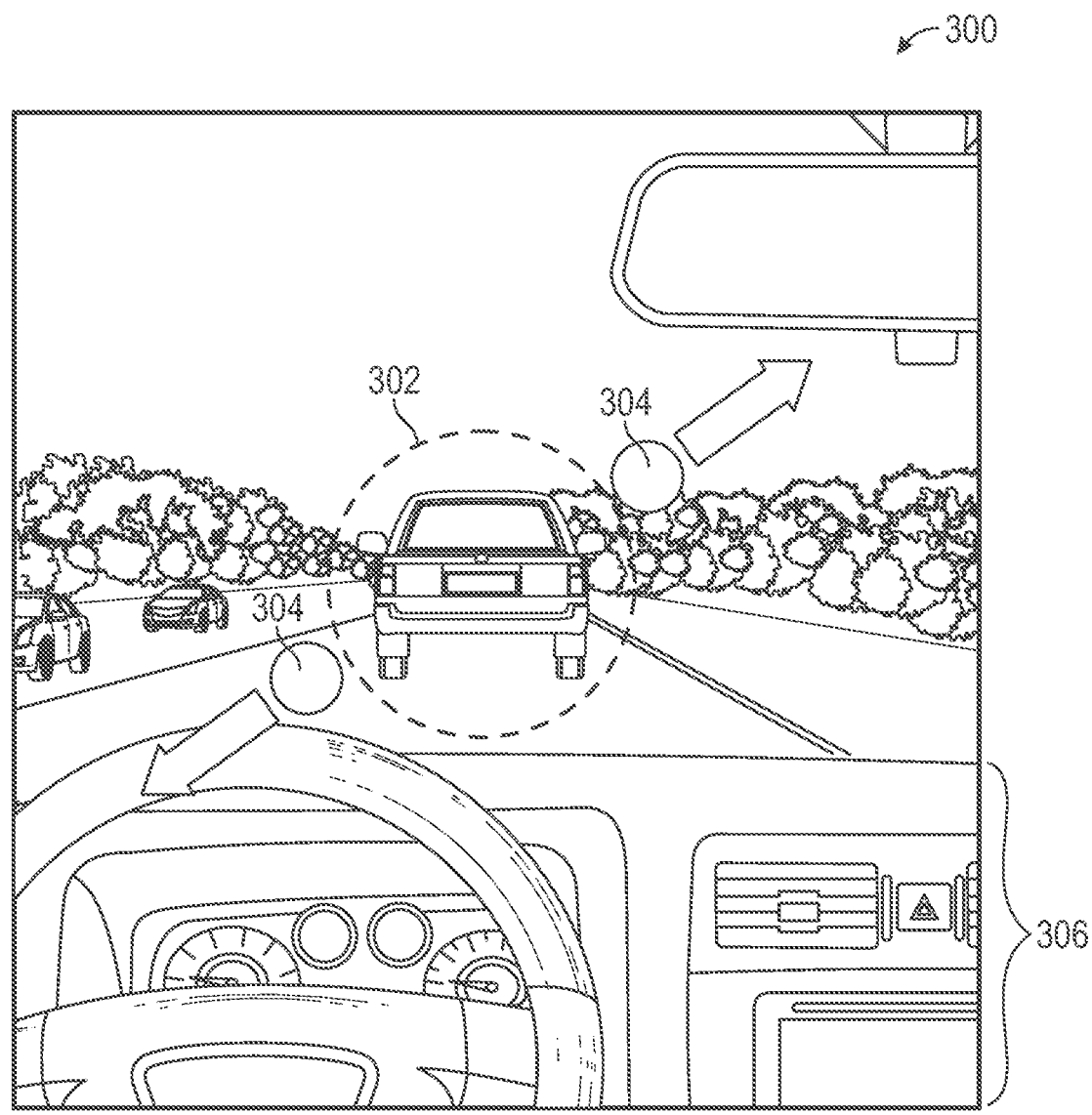
FIG. 3 is a diagram of another user interface touchscreen, in accordance with the disclosed embodiments.
Figure 4:
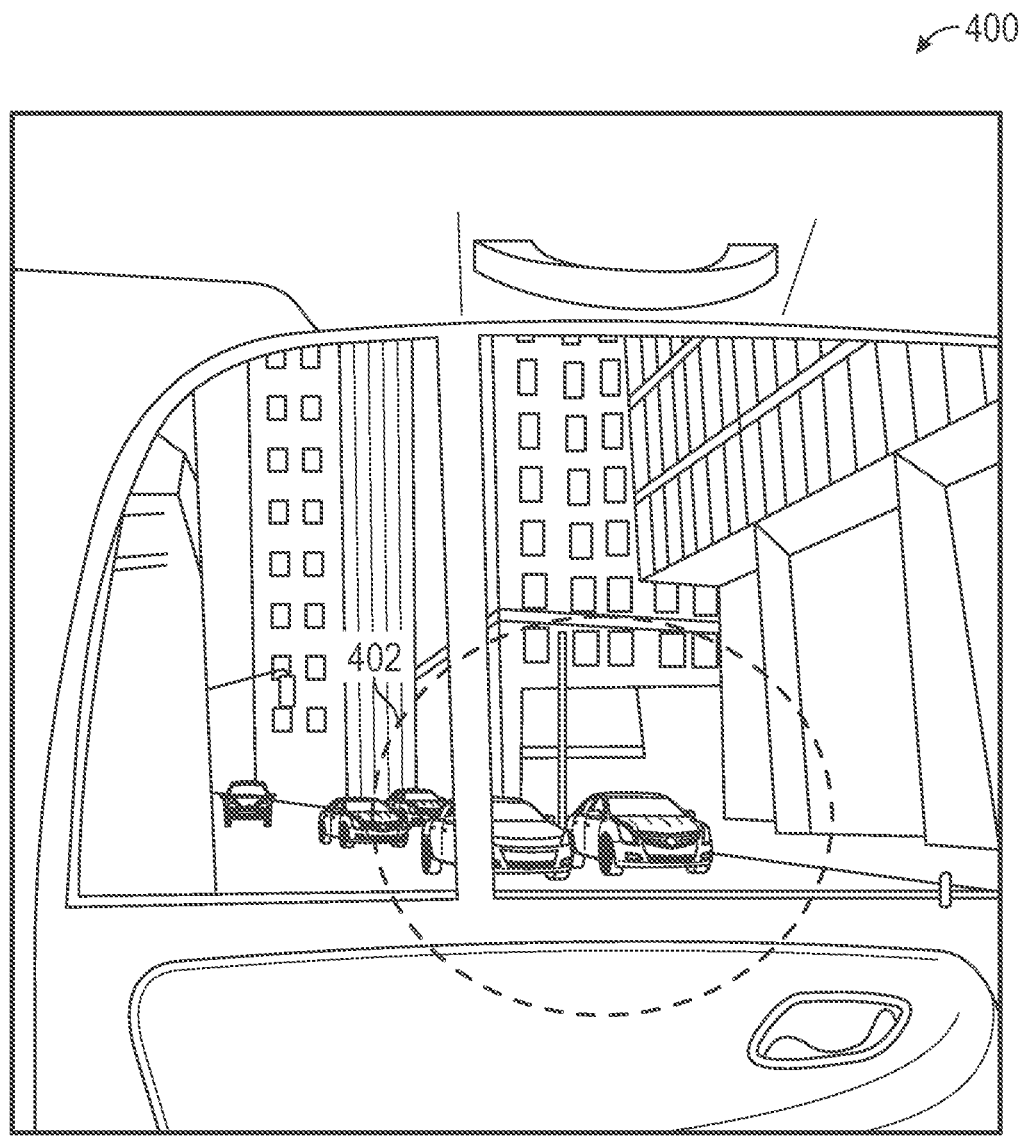
FIG. 4 is a diagram of a third user interface touchscreen, in accordance with the disclosed embodiments.

FIGS. 2-4 illustrate embodiments of a user interface touchscreen, user interactions with a user interface touchscreen, and the resulting manipulations of an image presented by the user interface touchscreen. It should be appreciated that FIGS. 2-4 depict simplified embodiments of the user interface touchscreen, and that some implementations of the user interface touchscreen may include additional elements or components. FIG. 2 illustrates a pinching-in, zoom out manipulation of a static image or video presentation; FIG. 3 illustrates a pinching-out, zoom in manipulation of a static image or video presentation; and FIG. 4 illustrates a user input selection of a graphical element to stop or pause a video presentation via the user interface touchscreen.

FIG. 2 depicts a user input interaction with the user interface touchscreen 200, wherein the user input interaction is a "pinching-in" motion toward a central point 202, such that the central point 202 (and the entire image shown by the user interface touchscreen 200), are zoomed out as a direct result of the pinching-in motion. As shown, the user makes contact with the user interface touchscreen 200 at finger points 204, and the user makes a motion pinching inward such that the finger points 204 come closer together (i.e., a first finger point of contact approaches a second finger point of contact, as a distance between the finger points 204 decreases) as the image zooms out. To zoom out, the central point 202 becomes smaller in the image shown by the user interface touchscreen 200, and as the central point 202 becomes smaller, the central point 202 appears farther away, in the image, from the user and the user interface touchscreen 200.

The user input interaction with the user interface touchscreen 200 is used to modify operation parameters of the first vehicle with autonomous capabilities. As shown, the user makes contact with the user interface touchscreen 200 and interacts by providing the "pinching-in" motion at the finger points 204 to zoom the image. The image presented by the user interface touchscreen 200 is an exterior view image that includes a second vehicle in front of the first vehicle with autonomous capabilities. User interaction with the user interface touchscreen 200 enables the user to change or modify operation parameters of the first vehicle with autonomous capabilities, as the operations of the first vehicle with autonomous capabilities relate to the operation of the second vehicle in front of the first vehicle with autonomous capabilities. Here, zooming out the image (by pinching-in motion in contact with the user interface touchscreen 200) causes an original surface area of the second vehicle to change from a first surface area in the pre-zoomed image to a second surface area in the zoomed image. The change in surface area corresponds to a change in distance between the first vehicle with autonomous capabilities and the second vehicle, wherein the change in distance is used to modify particular operation parameters of the first vehicle with autonomous capabilities. Zooming out the image corresponds to increasing a preconfigured following distance or stopping distance used by the first vehicle with autonomous capabilities during operation. Thus, the user interaction with the image changes an operation parameter (e.g., following distance, stopping distance) of the first vehicle with autonomous capabilities.

FIG. 3 depicts a user input interaction with the user interface touchscreen 300, wherein the user input interaction is a "pinching-out" motion away from a central point 302, such that the central point 302 (and the entire image shown by the user interface touchscreen 300) is zoomed in as a direct result of the pinching-out motion. As shown, the user makes contact with the user interface touchscreen 300 at finger points 304, and the user makes a motion pinching outward such that the finger points 304 move farther away from each other (i.e., a first finger point of contact moves away from a second finger point of contact, as a distance between the finger points 304 increases) as the image zooms in. To zoom in, the central point 302 becomes larger in the image shown by the user interface touchscreen 300, and as the central point 302 becomes larger, the central point 302 appears closer to the user and the user interface touchscreen 300, in the image.

The user input interaction with the user interface touchscreen 300 is used to modify operation parameters of the first vehicle with autonomous capabilities. As shown, the user makes contact with the user interface touchscreen 300 and interacts by providing the "pinching-out" motion at the finger points 304 to zoom the image. The image presented by the user interface touchscreen 300 is an exterior view image that includes a second vehicle in front of the first vehicle with autonomous capabilities. User interaction with the user interface touchscreen 300 enables the user to change or modify operation parameters of the first vehicle with autonomous capabilities, as the operations of the first vehicle with autonomous capabilities relate to the operation of the second vehicle in front of the first vehicle with autonomous capabilities. Here, zooming in the image (by pinching-out motion in contact with the user interface touchscreen 300) causes an original surface area of the second vehicle to change from a first surface area in the pre-zoomed image to a second surface area in the zoomed image. The change in surface area corresponds to a change in distance between the first vehicle with autonomous capabilities and the second vehicle, wherein the change in distance is used to modify particular operation parameters of the first vehicle with autonomous capabilities. Zooming in the image corresponds to decreasing a preconfigured following distance or stopping distance used by the first vehicle with autonomous capabilities during operation. Thus, the user interaction with the image changes an operation parameter (e.g., following distance, stopping distance) of the first vehicle with autonomous capabilities.

FIG. 4 depicts a user input selection of a graphical element to stop or pause a video presentation via the user interface touchscreen 400. As shown, the user interaction with the user interface touchscreen 400 includes the user making touch-based contact with the user interface touchscreen 400. In some embodiments, the user contact occurs at a graphical element presented at a particular location on the user interface touchscreen 400. For example, the user may select a button, check-mark, radio button, or any other user-selectable graphical element, via the user interface touchscreen 400 to stop the video presentation. In some embodiments, the user contact occurs at any location of the user interface touchscreen 400, wherein a particular graphical element is not required for selection. In this embodiment, user contact in any location is received and interpreted by the user interface touchscreen 400 to stop the video presentation.

Generally, the video presentation includes a series of images associated with an exterior view from the first vehicle with autonomous capabilities as the first vehicle with autonomous capabilities moves during operation. The video presentation may include a view of the road or driveway outside of the first vehicle with autonomous capabilities, road features (e.g., barriers, cones, trees, street signs, and traffic lights), upcoming potential turns and potential merges, and other vehicles driving on the roads with the first vehicle with autonomous capabilities. During playback of the video presentation, the user may make contact with the user interface touchscreen to stop the video presentation when the image reaches a specific point. For example, the video presentation may show a moving exterior view, including passing road features and other vehicles, as the first vehicle with autonomous capabilities is driving. The user may stop the video presentation as the first vehicle with autonomous capabilities is passing a potential turn, wherein the contact is made when the video presentation shows the most optimal point for the first vehicle with autonomous capabilities to execute the turn. Here, the user selects the most optimal point for the first vehicle with autonomous capabilities to execute the turn, which may be interpreted by the first vehicle with autonomous capabilities as an appropriate turning point Further, the image (e.g., the video presentation) has been calibrated for distance-based analysis using a plurality of data points. When the user makes contact with the touchscreen, the first vehicle with autonomous capabilities may also use the data points to determine an appropriate distance from the first vehicle with autonomous capabilities to the potential turn, and an appropriate turning speed based on the distance associated with the data points in the image. The first vehicle with autonomous capabilities operates according to a set of operational parameters, and the operational parameters include the turning speed calculated using the distance indicated by the user interaction with the user interface touchscreen 400.

The turning speed is calculated using the formula: speed=distance/time. A constant traveling speed of an oncoming vehicle in the image is obtained using sensors onboard the first vehicle with autonomous capabilities. Because the oncoming vehicle is traveling at a constant speed, and the city/highway environment is known, the system is capable of calculating a time value for how long it will take the oncoming vehicle to arrive at the location of the first vehicle with autonomous capabilities. Based on the user input to stop the video, a new distance value is calculated, and the new distance value is a vehicle offset value. The first vehicle with autonomous capabilities is configured to use a particular following distance and/or a particular stopping distance, and in certain embodiments, this distance value may also be used as a vehicle offset value. The vehicle offset value is a distance to a turning location in front of the oncoming vehicle. Based on the speed formula (speed/distance=time), the time value is calculated. The time value is a time for the first vehicle with autonomous capabilities to reach the oncoming vehicle speed and to travel a certain distance (e.g., the vehicle offset distance value) in order for the first vehicle with autonomous capabilities to remain positioned in front of the oncoming vehicle. Using the time value, the vehicle offset distance, and the required speed, a rate of acceleration required to set the turning speed may be determined.

Figure 5:
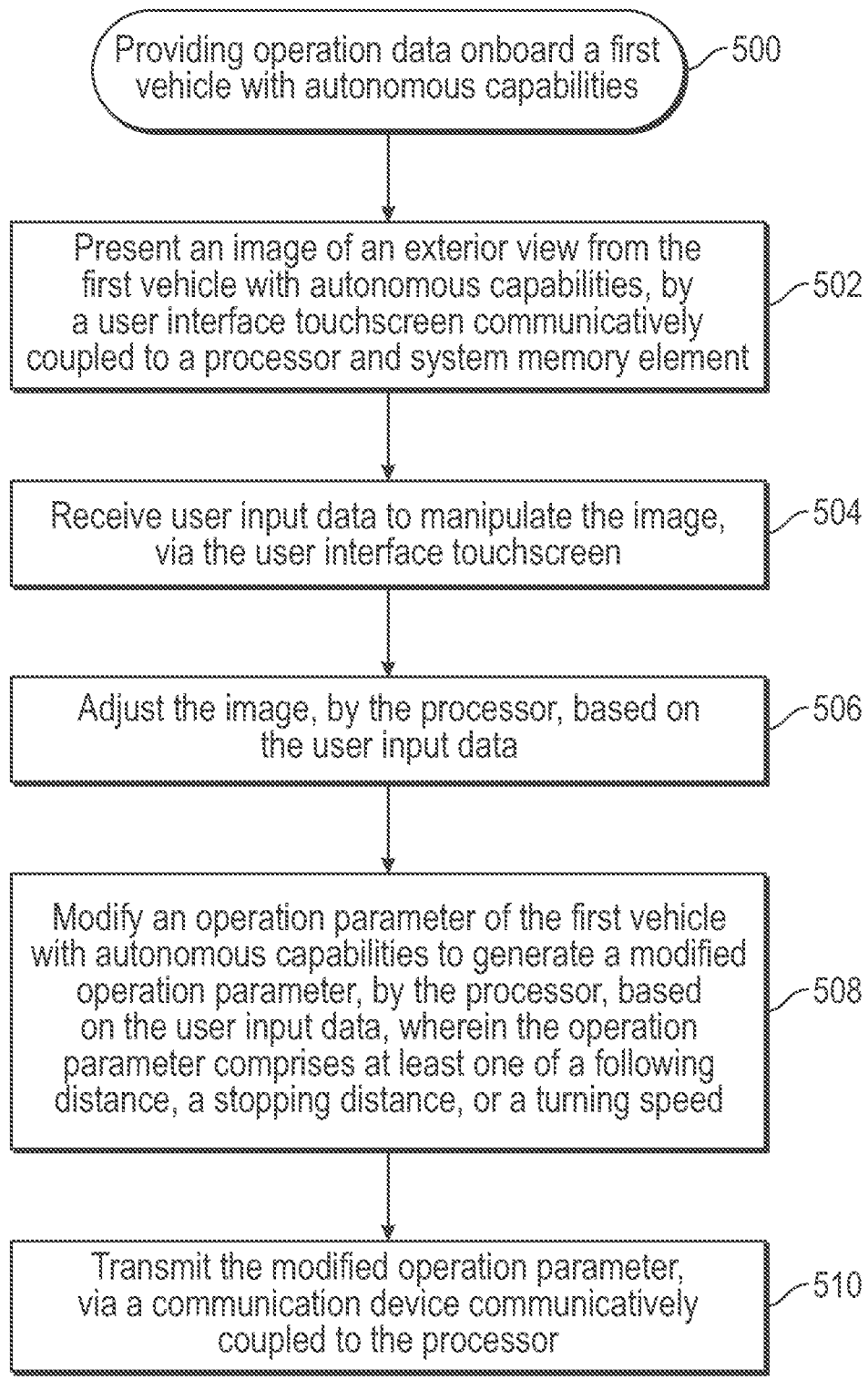
FIG. 5 is a flow chart that illustrates an embodiment of a process for providing operation data onboard a first vehicle with autonomous capabilities, in accordance with the disclosed embodiments.

FIG. 5 is a flow chart that illustrates an embodiment of a process 500 for providing operation data onboard a first vehicle with autonomous capabilities, in accordance with the disclosed embodiments. Suitable methodologies for providing operation data onboard a first vehicle with autonomous capabilities, using a static image or a video presentation, are described below with reference to FIGS. 6 and 10. First, the process 500 presents an image of an exterior view from the first vehicle with autonomous capabilities, by a user interface touchscreen communicatively coupled to a processor and a system memory element (step 502) onboard the vehicle. In certain embodiments, the image may be an actual image (i.e., a real image) of an exterior view from outside the first vehicle with autonomous capabilities, obtained in real-time via camera or other imaging device. In some embodiments, the image may be a stored image of the exterior view from outside the first vehicle with autonomous capabilities, (i) wherein the stored image is a real, actual image of an exterior view obtained via camera device, or (ii) wherein the stored image is a simulated exterior view from outside the first vehicle with autonomous capabilities.

Next, the process 500 receives user input data to manipulate the image, via the user interface touchscreen (step 504). User input data includes any user interaction with the image to change the appearance of the image, via the user interface touchscreen. The process 500 then adjusts the image, by the processor, based on the user input data (step 506). The image may be presented as a still-frame image or a video presentation of a plurality of still-frame images in sequence. The process 500 may receive any user input request to change the image in any way, including but not limited to: pinching-in the user interface touchscreen to zoom out; pinching-out the user interface touchscreen to zoom in; and touching or contacting the user interface touchscreen in any area to stop a video presentation. When the user input request to change the image is received, the process 500 then changes the image in accordance with the received user input instructions.

The process 500 modifies an operation parameter of the first vehicle with autonomous capabilities, to generate a modified operation parameter, by the processor, based on the user input data (step 508). Operation parameters may include, without limitation: a following distance, a stopping distance, a turning speed, or the like. Each of the operation parameters may be modified by increasing or decreasing a current value of the operation parameter, and the process 500 receives user input requests to increase or decrease a value of the operation parameter. For example, a configured and stored following distance, used by the first vehicle with autonomous capabilities, may be increased or decreased by user input interaction with the user interface touchscreen (e.g., pinching-in to zoom out, pinching-out to zoom in, or user input selection to stop a video presentation). Each user input modification to the image corresponds to a modification for an operation parameter of the first vehicle with autonomous capabilities. Thus, a user may change the way the first vehicle with autonomous capabilities operates by interacting with the presented image.

The process 500 then transmits the modified operation parameter, via a communication device communicatively coupled to the processor (step 510). Generally, the process 500 establishes communication connections to the autonomous vehicle systems, and transmits the modified operation parameter via the communication connections. Thus, the autonomous vehicle systems receive and use the modified operation parameter transmitted by the process 500. In certain embodiments, the process 500 also stores the modified operation parameter in local system memory and retains the modified operation parameter as a default condition that is used when the vehicle with autonomous capabilities is deactivated (i.e., when the vehicle is turned off and power is deactivated) and reactivated (i.e., powered-on when the ignition is cranked). In this example, when the vehicle is activated via turning the key in the ignition, the process 500 uses the most recently determined modified operation parameters as a set of initial parameters for use by the vehicle.

Figure 6:
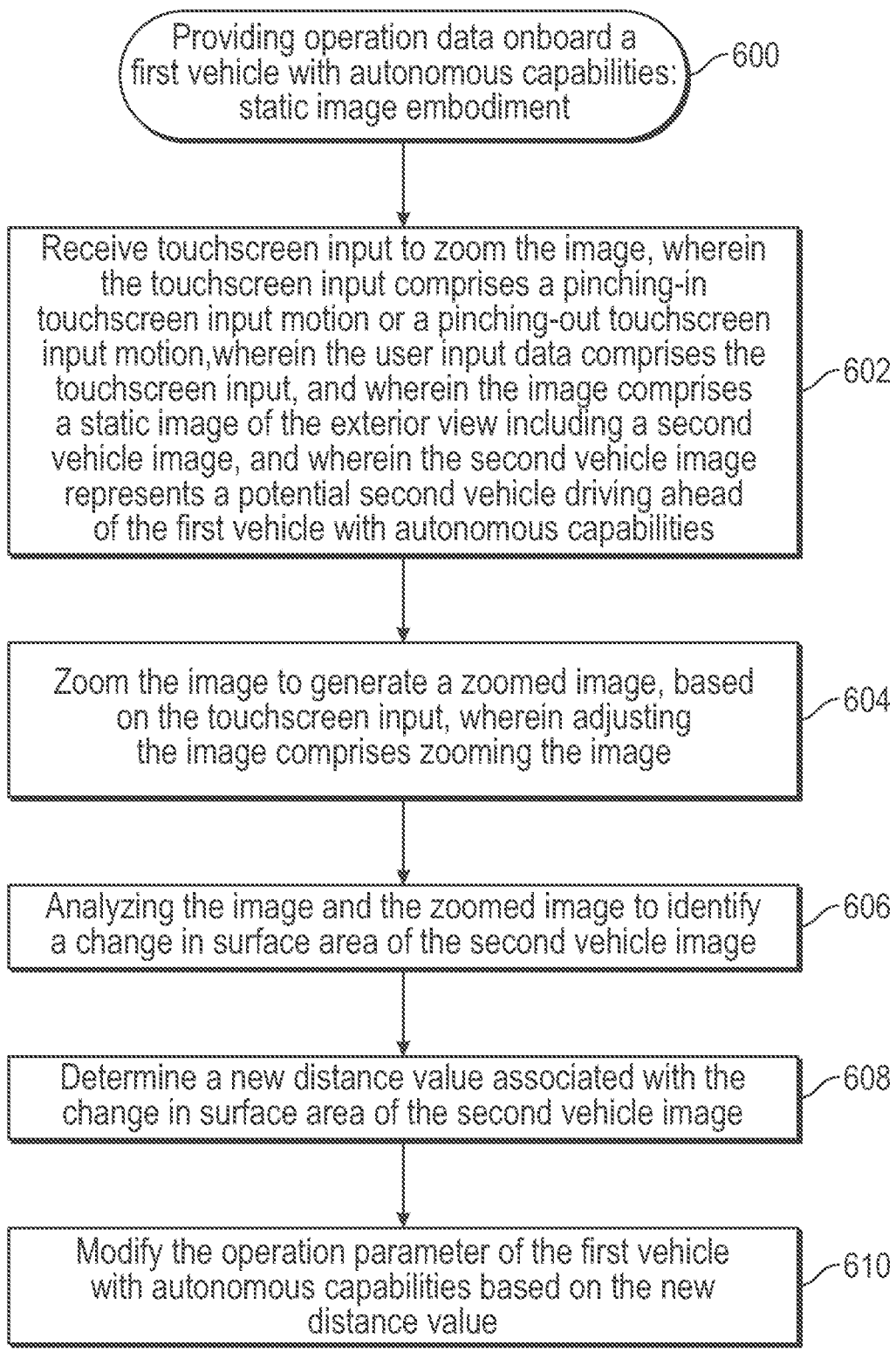
FIG. 6 is a flow chart that illustrates an embodiment of a process for receiving user input data to manipulate the image, via the user interface touchscreen, in accordance with the disclosed embodiments.

FIG. 6 is a flow chart that illustrates a static image embodiment of a process 600 for providing operation data onboard a first vehicle with autonomous capabilities, in accordance with the disclosed embodiments. It should be appreciated that the process 600 described in FIG. 6 represents one embodiment of the process 500 described above in the discussion of FIG. 5, including additional detail specific to a static image embodiment.

First, the process 600 receives touchscreen input to zoom the image (step 602). Generally, touchscreen input is received when a user makes physical contact with the touchscreen. The touchscreen input comprises a pinching-in touchscreen input motion or a pinching-out touchscreen input motion, and the user input data comprises the touchscreen input. Additionally, the image comprises a static image of the exterior view including a second vehicle image, wherein the second vehicle image represents a potential second vehicle driving ahead of the first vehicle with autonomous capabilities. The static image is presented onboard the vehicle, and the process 600 receives touchscreen input to zoom the static image onboard the vehicle.

Next, the process 600 zooms the image to generate a zoomed image, based on the touchscreen input, wherein adjusting the image comprises zooming the image (step 604). In some embodiments, the process 600 zooms in on the image, to decrease a distance between the first vehicle with autonomous capabilities and the second vehicle depicted in the image. In some embodiments, the process 600 zooms out on the image, to increase a distance between the first vehicle with autonomous capabilities and the second vehicle depicted in the image.

The process 600 analyzes the image and the zoomed image to identify a change in surface area of the second vehicle image (step 606). One embodiment for analyzing the image and the zoomed image to identify a change in surface area of the second vehicle image is described with regard to FIG. 7, including additional detail. The original image, prior to user manipulation (e.g., zoom), includes an initial second vehicle image. In the original image, the initial second vehicle image includes a first surface area. Zooming the original image generates a zoomed image and changes the initial second vehicle image to generate a final second vehicle image with a second surface area. The change in surface area is the difference between the first surface area and the second surface area.

The process 600 then determines a new distance value associated with the change in surface area of the second vehicle image (step 608). One embodiment for determining a new distance value associated with the change in surface area is described with regard to FIG. 8, including additional detail. Here, the process 600 has adjusted the image (i.e., zoomed the image) based on user input, and then determines a new distance value between the first vehicle with autonomous capabilities and the second vehicle depicted in the image using the change in surface area of the second vehicle image. The new distance value corresponds to a new, user-desired operating parameter of the first vehicle with autonomous capabilities (e.g., a stopping distance, a following distance).

The process 600 then modifies the operation parameter of the first vehicle with autonomous capabilities based on the new distance value (step 610). The new distance value may be used as a following distance parameter and/or a stopping distance parameter. In this scenario, the distance value is used directly as the following distance parameter or the stopping distance. In certain embodiments, the new distance value may be used to calculate a turning speed for the first vehicle with autonomous capabilities. One embodiment for calculating the turning speed based on the new distance value is described with regard to FIG. 9, including additional detail. As described herein, the process 600 uses the user interaction with the image (i.e., the user zooming the image by making contact with the touchscreen interface) to change an operation parameter of the first vehicle with autonomous capabilities.

Figure 7:
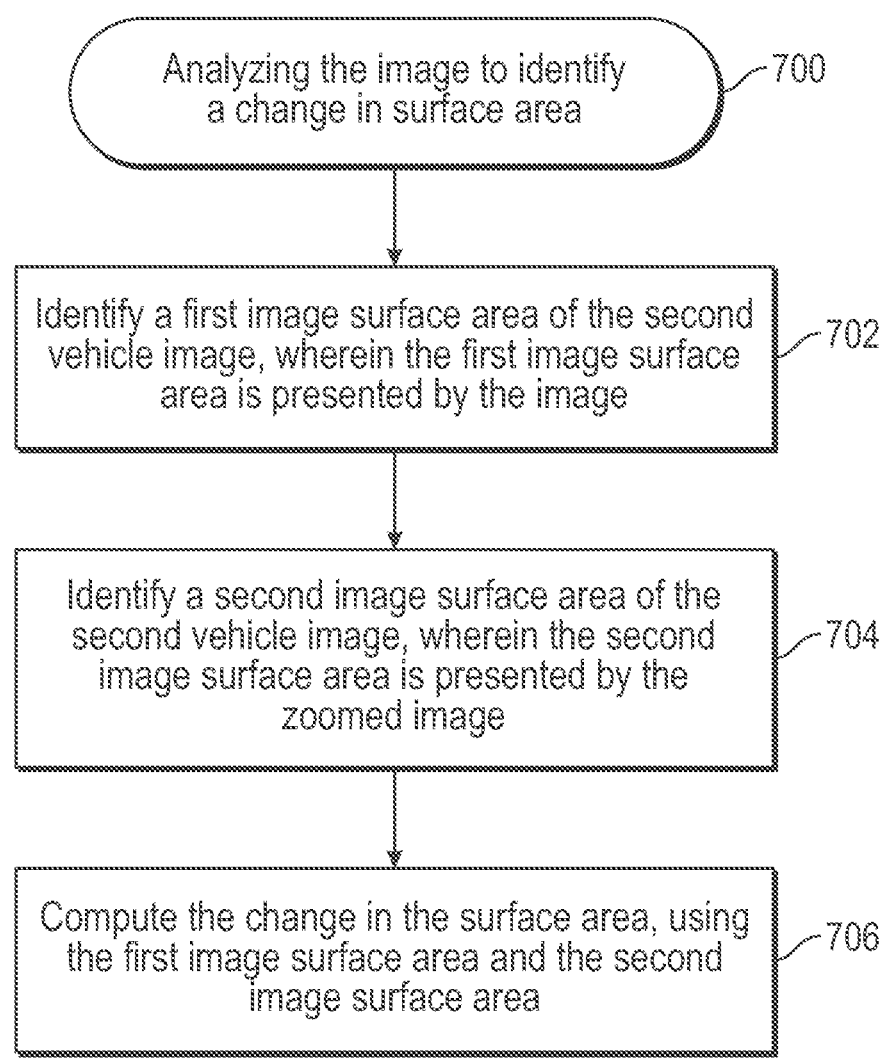
FIG. 7 is a flow chart that illustrates an embodiment of a process for analyzing the image to identify a change in surface area, in accordance with the disclosed embodiments.

FIG. 7 is a flow chart that illustrates an embodiment of a process 700 for analyzing the image to identify a change in surface area, in accordance with the disclosed embodiments. It should be appreciated that the process 700 described in FIG. 7 represents one embodiment of the step 606 described above in the discussion of FIG. 6, including additional detail.

First, the process 700 identifies a first image surface area of the second vehicle image, wherein the first image surface area is presented by the image (step 702). As described previously, an image is presented onboard the first vehicle with autonomous capabilities, and the image may be manipulated by a user via a touchscreen interface in order to change one or more autonomous vehicle parameters. The image includes a second vehicle image representing a second vehicle outside the first vehicle with autonomous capabilities. Here, the process 700 identifies the surface area of the second vehicle image, presented as part of the image, before user manipulation of the image has occurred. In other words, the second vehicle image is presented, and the process 700 identifies the surface area of the second vehicle image in the image as presented.

Next, the process 700 identifies a second image surface area of the second vehicle image, wherein the second image surface area is presented by the zoomed image (step 704). In step 702, the process 700 identifies a first surface area of the second vehicle, prior to user manipulation of the image. Here, in step 704, the process 700 identifies the second surface area of the second vehicle after the image has been manipulated (e.g., zoomed) by the user.

The process 700 then computes the change in the surface area, using the first image surface area and the second image surface area (step 706). The original image, prior to user manipulation (e.g., zoom), includes an initial second vehicle image. In the original image, the initial second vehicle image includes a first surface area. Zooming the original image generates a zoomed image and changes the initial second vehicle image to generate a final second vehicle image with a second surface area. The change in surface area is the difference between the first surface area and the second surface area.

Figure 8:
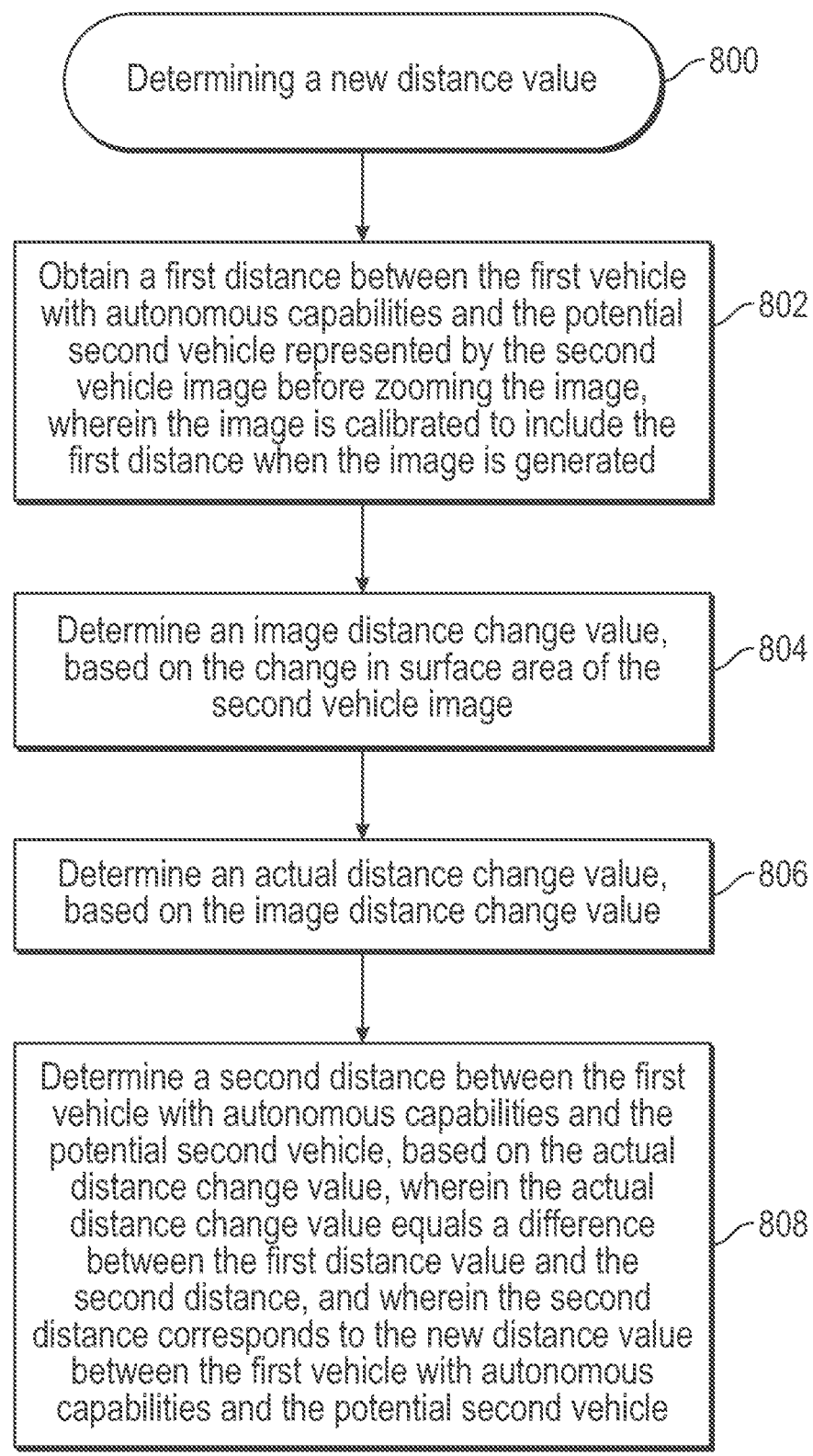
FIG. 8 is a flow chart that illustrates an embodiment of a process for determining a new distance value, in accordance with the disclosed embodiments.

FIG. 8 is a flow chart that illustrates an embodiment of a process 800 for determining a new distance value, in accordance with the disclosed embodiments. It should be appreciated that the process 800 described in FIG. 8 represents one embodiment of the step 608 described above in the discussion of FIG. 6, including additional detail. First, the process 800 obtains a first distance between the first vehicle with autonomous capabilities and the potential second vehicle represented by the second vehicle image before zooming the image, wherein the image is calibrated to include the first distance when the image is generated (step 802). Here, the process 800 obtains a given value for the first distance that is predefined and associated with the image.

Next, the process 800 determines an image distance change value, based on the change in surface area of the second vehicle image (step 804). As described previously (with regard to FIG. 7), the original image, prior to user manipulation (e.g., zoom), includes an initial second vehicle image. In the original image, the initial second vehicle image includes a first surface area. Zooming the original image generates a zoomed image and changes the initial second vehicle image to generate a final second vehicle image with a second surface area. The change in surface area is the difference between the first surface area and the second surface area.

The process 800 also determines an actual distance change value, based on the image distance change value (step 806). The image distance change value is the difference between (1) the pre-zoomed image distance between the first vehicle with autonomous capabilities and the potential second vehicle, and (2) the zoomed image distance between the first vehicle with autonomous capabilities and the potential second vehicle. The calculated image distance change value corresponds to a predetermined actual distance change value. In some embodiments, the process 800 determines the actual distance change value by performing a lookup in a system memory element.

The process 800 then determines a second distance between the first vehicle with autonomous capabilities and the potential second vehicle, based on the actual distance change value (step 808). The actual distance change value equals a difference between the first distance value and the second distance. Because the actual distance change value has been identified (in step 806) and the first distance value is a known value associated with the image (in step 802), the second distance can be calculated using these values. The second distance corresponds to the new distance value between the first vehicle with autonomous capabilities and the potential second vehicle. The new distance value (i.e., the second distance) is then used to modify operation parameters of the first vehicle with autonomous capabilities.

Figure 9:
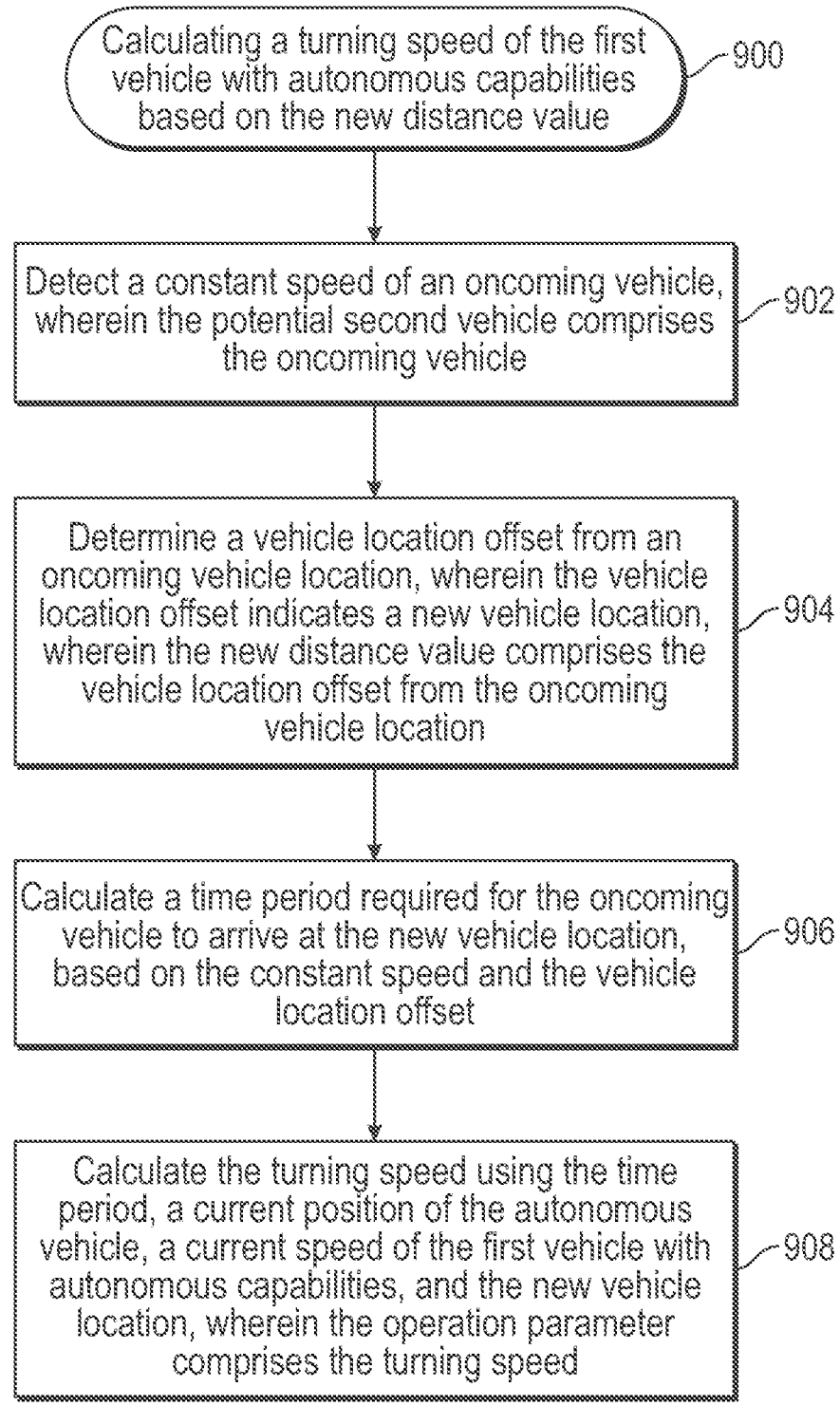
FIG. 9 is a flow chart that illustrates an embodiment of a process for calculating a turning speed of a first vehicle with autonomous capabilities based on the new distance value, in accordance with the disclosed embodiments.

FIG. 9 is a flow chart that illustrates an embodiment of a process 900 for calculating a turning speed of the first vehicle with autonomous capabilities based on the new distance value, in accordance with the disclosed embodiments. It should be appreciated that the process 900 described in FIG. 9 represents one embodiment of the step 610 described above in the discussion of FIG. 6, including additional detail. First, the process 900 detects a constant speed of an oncoming vehicle, wherein the potential second vehicle comprises the oncoming vehicle (step 902). A constant traveling speed of an oncoming vehicle in the image is obtained using sensors onboard the first vehicle with autonomous capabilities.

Next, the process 900 determines a vehicle location offset from an oncoming vehicle location, wherein the vehicle location offset indicates a new vehicle location, wherein the new distance value comprises the vehicle location offset from the oncoming vehicle location (step 904). Based on the user input to stop the video, a new distance value is calculated, and the new distance value is a vehicle offset value. The first vehicle with autonomous capabilities is configured to use a particular following distance and/or a particular stopping distance, and in certain embodiments, this distance value may also be used as a vehicle offset value. The vehicle offset value is a distance to a turning location in front of the oncoming vehicle.

After determining the vehicle location offset (step 904), the process 900 calculates a time period required for the oncoming vehicle to arrive at the new vehicle location, based on the constant speed and the vehicle location offset (step 906). Because the oncoming vehicle is traveling at a constant speed, and the city/highway environment is known, the system is capable of calculating a time value for how long it will take the oncoming vehicle to arrive at the location of the first vehicle with autonomous capabilities. Based on the speed formula (speed/distance=time), the time value is calculated. The time value is a time for the first vehicle with autonomous capabilities to reach the oncoming vehicle speed and to travel a certain distance (e.g., the vehicle offset distance value) in order for the first vehicle with autonomous capabilities to remain positioned in front of the oncoming vehicle.

The process 900 then calculates the turning speed using the time period, a current position of the first vehicle with autonomous capabilities, a current speed of the first vehicle with autonomous capabilities, and the new vehicle location, wherein the operation parameter comprises the turning speed (step 908). The turning speed is calculated using the formula: speed=distance/time. Using the time value, the vehicle offset distance, and the required speed, a rate of acceleration required to set the turning speed may be determined.

Figure 10:
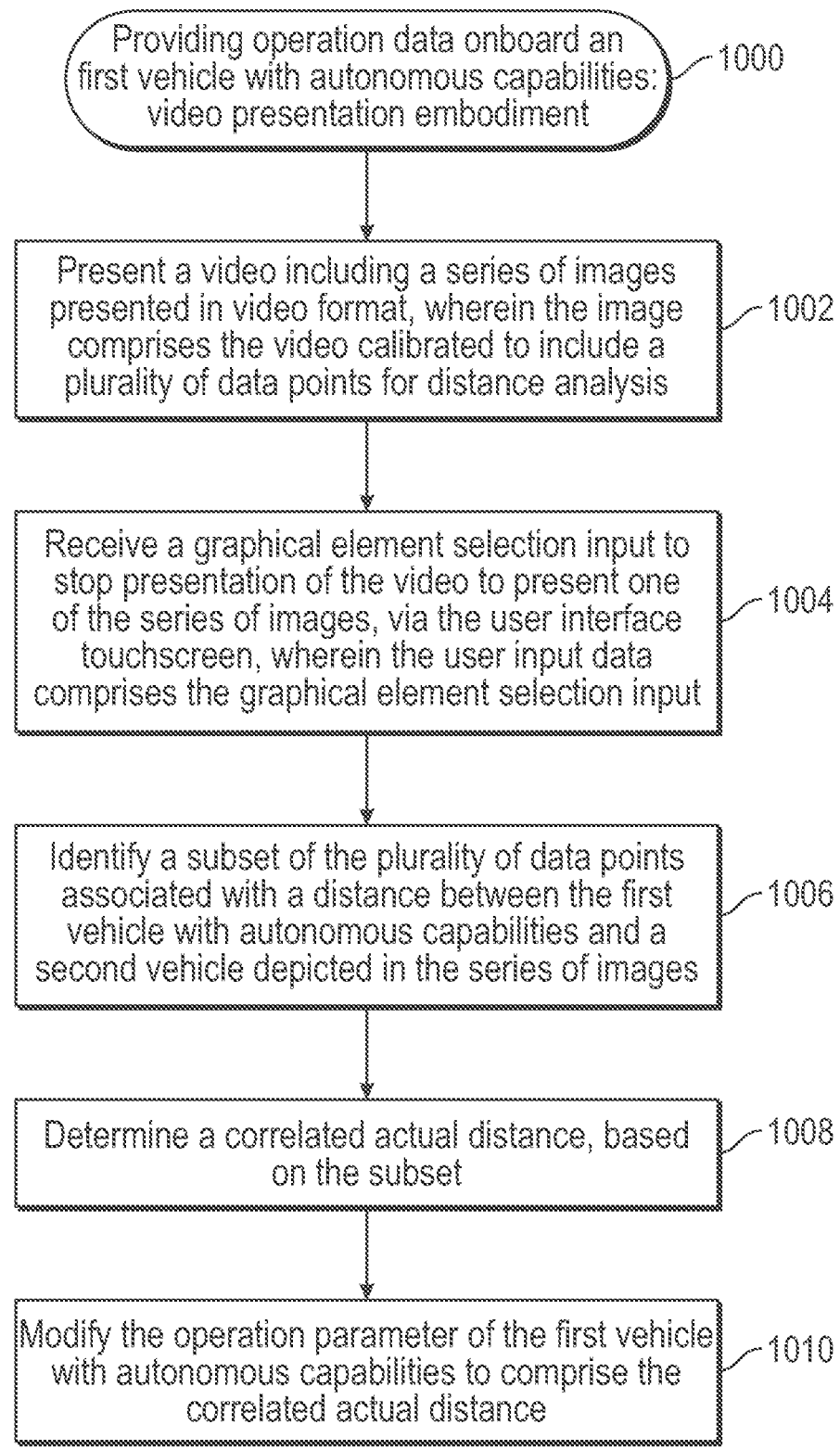
FIG. 10 is a flow chart that illustrates another embodiment of a process for receiving user input data to manipulate the image, via the user interface touchscreen, in accordance with the disclosed embodiments.

FIG. 10 is a flow chart that illustrates a video presentation embodiment of a process 1000 for providing operation data onboard a first vehicle with autonomous capabilities, in accordance with the disclosed embodiments. It should be appreciated that the process 1000 described in FIG. 10 represents one embodiment of the process 500 described above in the discussion of FIG. 5, including additional detail.

First, the process 1000 presents a video including a series of images presented in video format, wherein the image comprises the video calibrated to include a plurality of data points for distance analysis (step 1002). Playback of the video presents a simulated driving scene, (i.e., an exterior view from the outside of the first vehicle with autonomous capabilities 100 during driving motion). The simulated driving scene may include a depiction of any road features, including but not limited to trees, barriers, traffic cones, traffic signs, traffic lights, other vehicles, and the like. The video presentation includes a plurality of still-frame images, wherein each of the still-frame images is calibrated for distance analysis using data points.

Next, the process 1000 receives a graphical element selection input to stop presentation of the video to present one of the series of images, via the user interface touchscreen, wherein the user input data comprises the graphical element selection input (step 1004). Here, the process 1000 receives a user selection of a graphical button, checkbox, radio button, or other user-selectable graphical element presented via a user interface touchscreen. When the graphical element selection is received, the process 1000 responds by stopping or pausing playback of the video presentation.

The process 1000 then identifies a subset of the plurality of data points associated with the distance between the first vehicle with autonomous capabilities and a second vehicle depicted in the series of images (step 1006). Here, the process 1000 has adjusted the image (i.e., stopped the video on one particular still-image) based on user input, and then determines a new distance value between the first vehicle with autonomous capabilities and an object or second vehicle depicted in the still-image using data points of the image. The new distance value, indicated by data points of the stopped, still-image, is a distance that is applicable to the objects or vehicles depicted in the still-image.

The process 1000 determines a correlated actual distance, based on the subset (step 1008). After determining the distance applicable to the objects or vehicles depicted in the still-image, the process 1000 identifies a real, actual correlated distance value that is applicable to an operating parameter of the actual first vehicle with autonomous capabilities.

The process 1000 modifies the operation parameter of the first vehicle with autonomous capabilities to comprise the correlated actual distance (step 1010). The correlated actual distance may be used as a following distance parameter and/or a stopping distance parameter. Additionally, the correlated actual distance may be used to calculate a turning speed for the first vehicle with autonomous capabilities, as described previously with regard to FIG. 9. As described herein, the process 1000 uses the user interaction with the image (i.e., the user stopping the image by making contact with the touchscreen interface) to change an operation parameter of the first vehicle with autonomous capabilities.

The various tasks performed in connection with processes 500-1000 may be performed by software, hardware, firmware, or any combination thereof. For illustrative purposes, the preceding descriptions of processes 500-1000 may refer to elements mentioned above in connection with FIGS. 1-4. In practice, portions of processes 500-1000 may be performed by different elements of the described system. It should be appreciated that processes 500-1000 may include any number of additional or alternative tasks, the tasks shown in FIGS. 5-10 need not be performed in the illustrated order, and processes 500-1000 may be incorporated into a more comprehensive procedure or process having additional functionality not described in detail herein. Moreover, one or more of the tasks shown in FIGS. 5-10 could be omitted from embodiments of the processes 500-1000 as long as the intended overall functionality remains intact.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown in FIG. 1 depicts one exemplary arrangement of elements, additional intervening elements, devices, features, or components may be present in an embodiment of the depicted subject matter.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for providing operation data onboard a first vehicle with autonomous capabilities, the method comprising:
    presenting an image of an exterior view from the first vehicle with autonomous capabilities, by a user interface touchscreen communicatively coupled to a processor and system memory element;
    receiving a user input data to manipulate the image, via the user interface touchscreen;
    adjusting the image, by the processor, based on the user input data;
    modifying an operation parameter of the first vehicle with autonomous capabilities, by the processor, based on the user input data, to generate a modified operation parameter, wherein the operation parameter comprises at least one of a following distance, a stopping distance, or a turning speed, wherein the turning speed comprises a speed of the first vehicle while changing a travel direction; and
    transmitting the modified operation parameter, via the processor, wherein receiving the user input data further comprises:
    receiving touchscreen input to zoom the image, wherein the user input data comprises a pinching-in touchscreen input motion or a pinching-out touchscreen input motion, and wherein the image comprises a static image of the exterior view including a second vehicle image, and wherein the second vehicle image represents a potential second vehicle driving ahead of the first vehicle with autonomous capabilities;
    wherein adjusting the image further comprises zooming the image to generate a zoomed image, based on the touchscreen input, wherein adjusting the image comprises zooming out the image or zooming in the image; and
    wherein modifying the operation parameter further comprises:
        analyzing the image and the zoomed image to identify a change in surface area of the second vehicle image;
        determining a new distance value associated with the change in surface area of the second vehicle image; and
        modifying the operation parameter of the first vehicle with autonomous capabilities based on the new distance value.

2. The method of claim 1, wherein analyzing the image further comprises:
    identifying a first image surface area of the second vehicle image, wherein the first image surface area is presented by the image;
    identifying a second image surface area of the second vehicle image, wherein the second image surface area is presented by the zoomed image; and
    computing the change in the surface area, using the first image surface area and the second image surface area.

3. The method of claim 1, wherein determining the new distance value further comprises:
    obtaining a first distance between the first vehicle with autonomous capabilities and the potential second vehicle represented by the second vehicle image before zooming the image, wherein the image is calibrated to include the first distance when the image is generated;
    determining an image distance change value, based on the change in surface area of the second vehicle image;
    determining an actual distance change value, based on the image distance change value; and
    determining a second distance between the first vehicle with autonomous capabilities and the potential second vehicle, based on the actual distance change value, wherein the actual distance change value equals a difference between the first distance value and the second distance, and wherein the second distance corresponds to the new distance value between the first vehicle with autonomous capabilities and the potential second vehicle.

4. The method of claim 1, wherein the new distance value comprises the following distance; and
    wherein the operation parameter comprises the following distance.

5. The method of claim 1, wherein the new distance value comprises the stopping distance; and
    wherein the operation parameter comprises the stopping distance.

6. The method of claim 1, wherein modifying the operation parameter further comprises:
    detecting a constant speed of an oncoming vehicle, wherein the potential second vehicle comprises the oncoming vehicle;
    determining a vehicle location offset from an oncoming vehicle location, wherein the vehicle location offset indicates a new vehicle location, wherein the new distance value comprises the vehicle location offset from the oncoming vehicle location;
    calculating a time period required for the oncoming vehicle to arrive at the new vehicle location, based on the constant speed and the vehicle location offset;
    calculating the turning speed using the time period, a current position of the first vehicle with autonomous capabilities, a current speed of the first vehicle with autonomous capabilities, and the new vehicle location;
    wherein the operation parameter comprises the turning speed.

7. The method of claim 1, further comprising:
    presenting a video including a series of images presented in video format, wherein the image comprises the video calibrated to include a plurality of data points for distance analysis;
    receiving a graphical element selection input to stop presentation of the video to present one of the series of images, wherein the user input data comprises the graphical element selection input, and wherein adjusting the image comprises stopping presentation of the video;

identifying a subset of the plurality of data points associated with a distance between the first vehicle with autonomous capabilities and a second vehicle depicted in the one of the series of images, wherein the following distance comprises the distance;

determining a correlated actual distance, based on the subset; and modifying the following distance of the first vehicle with autonomous capabilities to comprise the correlated actual distance, wherein the operation parameter comprises the following distance.

8. The method of claim 1, further comprising:

presenting a video including a series of images presented in video format, wherein the image comprises the video calibrated to include a plurality of data points for distance analysis;

receiving a graphical element selection input to stop presentation of the video to present one of the series of images, wherein the user input data comprises the graphical element selection input, and wherein adjusting the image comprises stopping presentation of the video;

identifying a subset of the plurality of data points associated with a distance between the first vehicle with autonomous capabilities and a second vehicle depicted in the one of the series of images, wherein the stopping distance comprises the distance;

determining a correlated actual distance, based on the subset; and modifying the stopping distance of the first vehicle with autonomous capabilities to comprise the correlated actual distance, wherein the operation parameter comprises the stopping distance.

9. The method of claim 1, further comprising:

presenting a video including a series of images presented in video format, wherein the image comprises the video calibrated to include a plurality of data points for distance analysis;

receiving a graphical element selection input to stop presentation of the video to present one of the series of images, wherein the user input data comprises the graphical element selection input, and wherein adjusting the image comprises stopping presentation of the video;

identifying a subset of the plurality of data points associated with a distance between the first vehicle with autonomous capabilities and one or more oncoming cars depicted in the one of the series of images;

determining a correlated actual distance, based on the subset;

modifying the turning speed of the first vehicle with autonomous capabilities, based on a current location of the first vehicle with autonomous capabilities and the correlated actual distance, wherein the operation parameter comprises the turning speed.

10. A system for providing operation data onboard a first vehicle with autonomous capabilities, the system comprising:

a system memory element;

a user interface touchscreen, configured to receive a user input data via user contact with the user interface touchscreen; and at least one processor communicatively coupled to the system memory element, and the user interface touchscreen, the at least one processor configured to:

present an image of an exterior view from the first vehicle with autonomous capabilities, via the user interface touchscreen;

receive the user input data to manipulate the image, via the user interface touchscreen;

adjust the image, based on the user input data;

modify an operation parameter of the first vehicle with autonomous capabilities to generate a modified operation parameter, based on the user input data, wherein the operation parameter comprises at least one of a following distance, a stopping distance, or a turning speed, wherein the turning speed comprises a speed of the first vehicle while changing a travel direction; and transmit the modified operation parameter, wherein the at least one processor is further configured to receive the user input data, by:

receiving touchscreen input to zoom the image, wherein the user input data comprises a pinching-in touchscreen input motion or a pinching-out touchscreen input motion, and wherein the image comprises a static image of the exterior view including a second vehicle image, and wherein the second vehicle image represents a potential second vehicle driving ahead of the first vehicle with autonomous capabilities;

wherein the at least one processor is further configured to adjust the image by zooming the image to generate a zoomed image, based on the touchscreen input, wherein adjusting the image comprises zooming out the image or zooming in the image; and wherein the at least one processor is further configured to modify the operation parameter, by:

analyzing the image and the zoomed image to identify a change in surface area of the second vehicle image;

determining a new distance value associated with the change in surface area of the second vehicle image; and modifying the operation parameter of the first vehicle with autonomous capabilities based on the new distance value.

11. The system of claim 10, wherein the at least one processor is further configured to analyze the image, by:

identifying a first image surface area of the second vehicle image, wherein the first image surface area is presented by the image;

identifying a second image surface area of the second vehicle image, wherein the second image surface area is presented by the zoomed image; and computing the change in the surface area, using the first image surface area and the second image surface area.

12. The system of claim 10, wherein the at least one processor is further configured to:

obtain a first distance between the first vehicle with autonomous capabilities and the potential second vehicle represented by the second vehicle image before zooming the image, wherein the image is calibrated to include the first distance when the image is generated;

determine an image distance change value, based on the change in surface area of the second vehicle image;

determine an actual distance change value, based on the image distance change value; and determine a second distance between the first vehicle with autonomous capabilities and the potential second vehicle, based on the actual distance change value, wherein the actual distance change value equals a difference between the first distance value and the second distance, and wherein the second distance corresponds to the new distance value between the first vehicle with autonomous capabilities and the potential second vehicle.

13. The system of claim 10, wherein the new distance value comprises the following distance; and
wherein the operation parameter comprises the following distance.

14. The system of claim 10, wherein the new distance value comprises the stopping distance; and
wherein the operation parameter comprises the stopping distance.

15. The method of claim 10, wherein the at least one processor is further configured to modify the operation parameter, by:
detecting a constant speed of an oncoming vehicle, wherein the potential second vehicle comprises the oncoming vehicle;
determining a vehicle location offset from an oncoming vehicle location, wherein the vehicle location offset indicates a new vehicle location, wherein the new distance value comprises the vehicle location offset from the oncoming vehicle location;
calculating a time period required for the oncoming vehicle to arrive at the new vehicle location, based on the constant speed and the vehicle location offset;
calculating the turning speed using the time period, a current position of the first vehicle with autonomous capabilities, a current speed of the first vehicle with autonomous capabilities, and the new vehicle location;
wherein the operation parameter comprises the turning speed.

16. The system of claim 10, wherein the at least one processor is further configured to:
present, via the user interface touchscreen, a video including a series of images presented in video format, wherein the image comprises the video calibrated to include a plurality of data points for distance analysis;
receive a graphical element selection input to stop presentation of the video to present one of the series of images, wherein the user input data comprises the graphical element selection input, and wherein adjusting the image comprises stopping presentation of the video;
identify a subset of the plurality of data points associated with a distance between the first vehicle with autonomous capabilities and a second vehicle depicted in the one of the series of images, wherein the following distance comprises the distance;
determine a correlated actual distance, based on the subset; and
modify the following distance of the first vehicle with autonomous capabilities to comprise the correlated actual distance, wherein the operation parameter comprises the following distance.

17. The system of claim 10, wherein the at least one processor is further configured to:
present, via the user interface touchscreen, a video including a series of images presented in video format, wherein the image comprises the video calibrated to include a plurality of data points for distance analysis;
receive a graphical element selection input to stop presentation of the video to present one of the series of images, wherein the user input data comprises the graphical element selection input, and wherein adjusting the image comprises stopping presentation of the video;
identify a subset of the plurality of data points associated with a distance between the first vehicle with autonomous capabilities and a second vehicle depicted in the one of the series of images, wherein the stopping distance comprises the distance;
determine a correlated actual distance, based on the subset; and
modify the stopping distance of the first vehicle with autonomous capabilities to comprise the correlated actual distance, wherein the operation parameter comprises the stopping distance.

18. The system of claim 10, wherein the at least one processor is further configured to:
present, via the user interface touchscreen, a video including a series of images presented in video format, wherein the image comprises the video calibrated to include a plurality of data points for distance analysis;
receive a graphical element selection input to stop presentation of the video to present one of the series of images, wherein the user input data comprises the graphical element selection input, and wherein adjusting the image comprises stopping presentation of the video;
identify a subset of the plurality of data points associated with a distance between the first vehicle with autonomous capabilities and one or more oncoming cars depicted in the one of the series of images;
determine a correlated actual distance, based on the subset; and
modify the turning speed of the first vehicle with autonomous capabilities, based on a current location of the first vehicle with autonomous capabilities and the correlated actual distance, wherein the operation parameter comprises the turning speed.

* * * * *